United States Patent [19]

Woskov et al.

[11] Patent Number: 5,785,426
[45] Date of Patent: Jul. 28, 1998

[54] SELF-CALIBRATED ACTIVE PYROMETER FOR FURNACE TEMPERATURE MEASUREMENTS

[75] Inventors: Paul P. Woskov, Bedford; Daniel R. Cohn, Chestnuthill, both of Mass.; Charles H. Titus, Newtown Square, Pa.; Jeffrey E. Surma, Kennewick, Wash.

[73] Assignees: Massachusetts Institute of Technology, Cambridge, Mass.; Battelle Memorial Institute, Richland, Wash.

[21] Appl. No.: 539,818

[22] Filed: Oct. 6, 1995

Related U.S. Application Data

[63] Continuation-in-part of Ser. No. 181,706, Jan. 14, 1994, Pat. No. 5,573,339.
[51] Int. Cl.[6] .................... G01J 5/08; G01J 5/62
[52] U.S. Cl. .................... 374/126; 374/128; 374/131; 374/9; 374/130; 374/122
[58] Field of Search .................... 374/122, 126, 374/128, 130, 131, 9, 141; 250/338.1

[56] References Cited

U.S. PATENT DOCUMENTS

| | | |
|---|---|---|
| 4,235,107 | 11/1980 | Lüdeke et al. |
| 4,292,638 | 9/1981 | Lazarchik et al. |
| 4,568,199 | 2/1986 | Schmidt. |
| 4,568,200 | 2/1986 | Hatono et al. ............ 374/122 |
| 4,673,298 | 6/1987 | Hunter et al. ............ 374/122 |
| 4,708,493 | 11/1987 | Stein. |
| 4,919,542 | 4/1990 | Nulman et al. |
| 4,956,538 | 9/1990 | Moslehi. |
| 4,979,133 | 12/1990 | Arima et al. |
| 4,979,134 | 12/1990 | Arima et al. |

(List continued on next page.)

FOREIGN PATENT DOCUMENTS

| | | |
|---|---|---|
| 56-108944 | 8/1981 | Japan. |
| 57-161521 | 10/1982 | Japan. |
| 58-171643 | 8/1983 | Japan. |
| 1 436 180 | 5/1976 | United Kingdom. |
| 95/19575 | 7/1995 | WIPO. |

OTHER PUBLICATIONS

H.R. Fetterman et al., Far–ir Heterodyne Radiometric Measurements with Quasioptical Schottky Diode Mixers, Appl. Phys. Lett., vol. 33, pp. 151–154 (1978).

F.P. Incropera et al., "Introduction to Heat Transer", 2nd Ed., pp. 677–707, John Wiley and Sons, New York (1990).

(List continued on next page.)

Primary Examiner—Diego F. F. Gutierrez
Attorney, Agent, or Firm—Choate, Hall & Stewart

[57] ABSTRACT

Pyrometer with a probe beam superimposed on its field-of-view for furnace temperature measurements. The pyrometer includes a heterodyne millimeter/sub-millimeter-wave or microwave receiver including a millimeter/sub-millimeter-wave or microwave source for probing. The receiver is adapted to receive radiation from a surface whose temperature is to be measured. The radiation includes a surface emission portion and a surface reflection portion which includes the probe beam energy reflected from the surface. The surface emission portion is related to the surface temperature and the surface reflection portion is related to the emissivity of the surface. The simultaneous measurement of surface emissivity serves as a real time calibration of the temperature measurement. In an alternative embodiment, a translatable base plate and a visible laser beam allow slow mapping out of interference patterns and obtaining peak values therefor. The invention also includes a waveguide having a replaceable end portion, an insulating refractory sleeve and/or a source of inert gas flow. The pyrometer may be used in conjunction with a waveguide to form a system for temperature measurements in a furnace. The system may employ a chopper or alternatively, be constructed without a chopper. The system may also include an auxiliary reflector for surface emissivity measurements.

23 Claims, 9 Drawing Sheets

U.S. PATENT DOCUMENTS

| | | |
|---|---|---|
| 4,984,902 | 1/1991 | Crowley . |
| 5,029,117 | 7/1991 | Patton . |
| 5,036,289 | 7/1991 | Duran . |
| 5,255,286 | 10/1993 | Moslehi et al. . |
| 5,305,416 | 4/1994 | Fiory . |
| 5,308,161 | 5/1994 | Stein . |
| 5,326,173 | 7/1994 | Evans et al. . |
| 5,573,339 | 11/1996 | Woskov et al. .......................... 374/126 |

OTHER PUBLICATIONS

J.D. Kraus, Radio Astronomy, pp. 238–285 by M.E. Tiuri, Radio–Telescope Receivers, McGraw Hill, New York (1975).

Ma et al., "Night Moth Eye Window for the Millimeter and Sub–Millimetre Wave Region", Optica Acta, vol. 30, No. 12, pp. 1685–1695 (1983).

J.H. Rainwater, Radiometers: Electronic Eyes that See Noise, Microwaves, pp. 58–62 (Sep. 1978).

Richard et al., "Mesure de temperature par radiometrie hertzienne, Mesures Regulation Automatisme", vol. 9 (Sep. 1964).

Thumm, Computer–Aided Analysis and Design of Corrugated $TE_{11}$ to $HE_{11}$ Mode Converters in Highly Overmoded Waveguides, Intern. J. of Infrared and Millimeter Waves, vol. 6, pp. 577–597 (1985).

Wilson et al., The Optical Properties of Moth Eye Antireflection Surfaces, Optica Acta, vol. 29, pp. 993–1009 (1982).

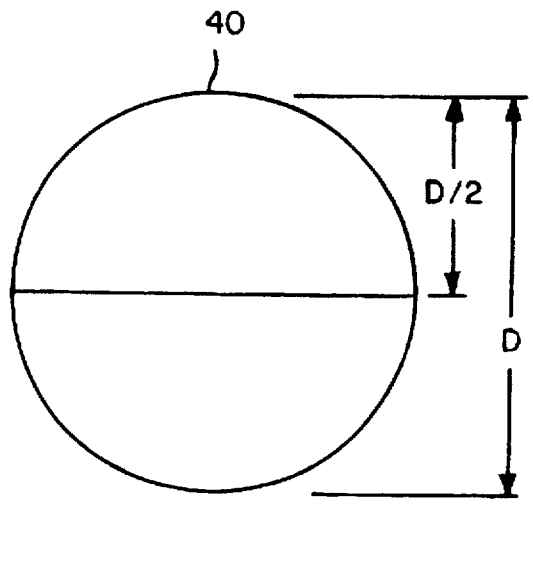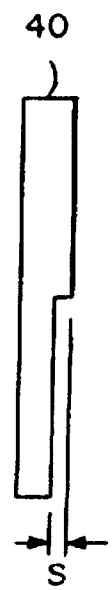
FIG.2a   FIG.2b
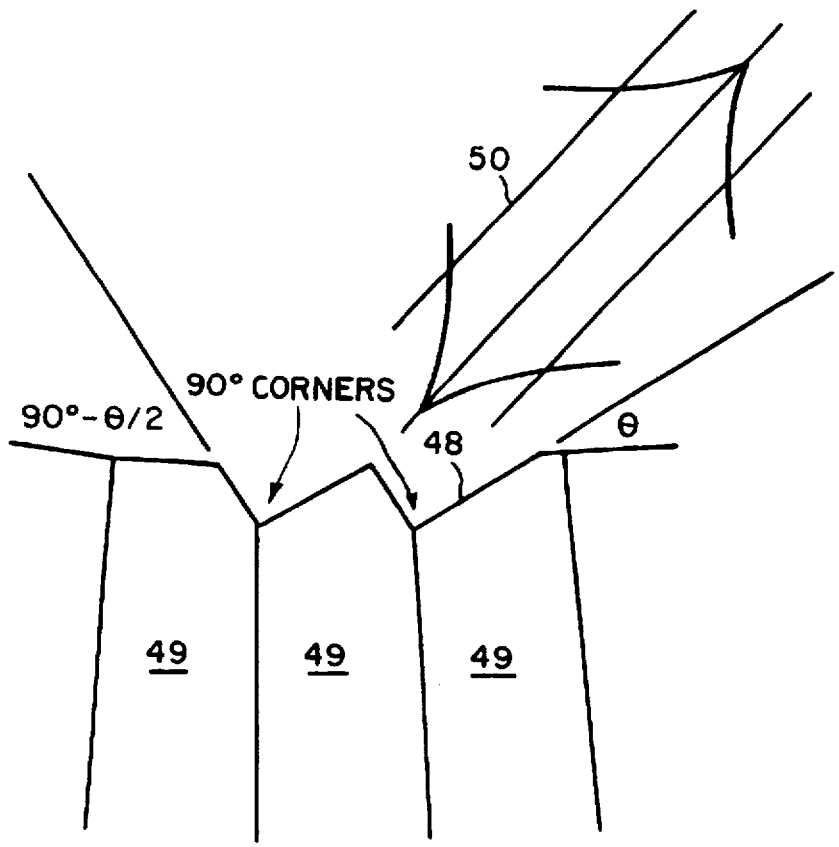
FIG. 3

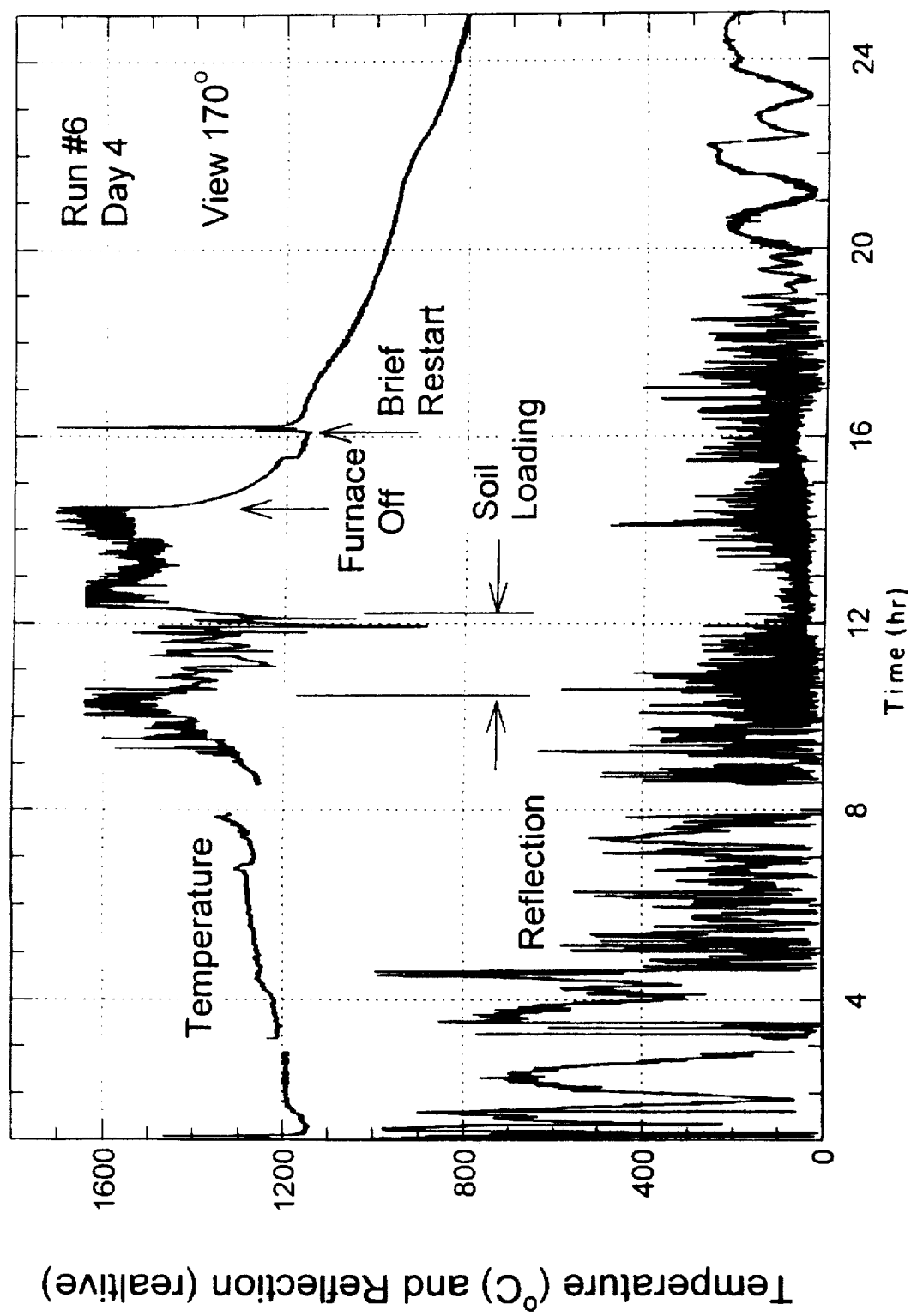
FIG. 10 Temperature & Reflection Signals for the Fourth Day of Run #6 in the Mark II Furnace

SELF-CALIBRATED ACTIVE PYROMETER FOR FURNACE TEMPERATURE MEASUREMENTS

CROSS-REFERENCE TO RELATED APPLICATION

This application is a continuation-in-part application of U.S. Ser. No. 08/181,706, filed Jan. 14, 1994, now U.S. Pat. No. 5,573,339 the entire contents of which are incorporated herein by reference.

This invention was made with government support under MIT Subcontract Number 154462-A-L2 with Battelle Laboratories (under DOE Prime Contract Number DE-AC06-76RLO 1830). The government has certain rights in the invention.

TECHNICAL FIELD

This invention relates to method and apparatus for measuring the temperature and emissivity of surfaces, and more particularly to method and apparatus for measuring the temperature and emissivity on the inside surfaces of an operating furnace using an active millimeter/submillimeter-wave or microwave pyrometer with rotatable waveguide/mirror optics positioned inside the furnace.

BACKGROUND OF THE INVENTION

There exists a need for reliable, accurate means for measuring temperature profiles inside furnaces to monitor furnace performance and to optimize furnace operation. It is desirable that these temperature measurements be spatially resolved. Economic and environmental concerns make it critical that furnaces used in applications such as waste remediation and industrial processes be efficient with little or no hazardous emissions. Knowledge of the internal spatial temperature distribution within such a furnace is a key parameter for monitoring furnace performance and is necessary for furnace optimization. Real time temperature measurements inside the hot and dirty environment of a furnace are of fundamental significance for controlling and monitoring furnace process.

Present temperature measurement instruments have a number of shortcomings that make them unreliable, inaccurate, or hazardous for use inside the hot, hostile environment of furnaces. For example, infrared pyrometers cannot view through smokey, hazy, and/or particle filled off-gases, their view can be further blocked by deposits on exposed viewing windows, and knowledge of surface emissivity is required to accurately interpret temperature. Other temperature sensors such as thermocouples require electrical wires being brought into the furnace which have a limited high temperature capability, are prone to failure and, would be a hazard in electric furnace applications.

It therefore would be desirable to provide method and apparatus for reliable measurements of internal furnace temperature profiles which overcomes the shortcomings associated with the prior art.

SUMMARY OF THE INVENTION

A pyrometer for temperature measurements according to the invention includes a heterodyne millimeter/sub-millimeter-wave or microwave receiver including a millimeter/sub-millimeter probe beam superimposed on its field-of-view. Preferably, the probe beam would be produced by the heterodyne receiver local oscillator. The receiver is adapted to receive radiation from a surface whose temperature is to be measured. The radiation includes a surface emission portion and a surface reflection portion which includes the probe beam energy reflected from the surface. The surface emission portion is related to the surface temperature and the surface reflection portion is related to the emissivity of the surface. In a preferred embodiment, a waveguide is provided for delivering the radiation to the receiver. A preferred waveguide is a quasi-optical graphite waveguide having internal corrugations and mirrors. In this embodiment, a further corrugated metal waveguide is provided for conversion of $TE_{11}$ to $HE_{11}$ modes. This embodiment also includes a chopper which periodically blocks the receiver field-of-view. Further, a phase splitter is provided to eliminate standing wave interference that would result from the use of a coherent probe beam. It is also preferred that the surface whose temperature is being measured include retroreflectors to insure a return reflection of the probe beam that is not sensitive to alignment.

Yet another aspect of the invention is a furnace temperature measuring system which includes a furnace having a surface whose temperature is to be measured. A waveguide is disposed within the furnace for directing radiation through a window to a heterodyne receiver disposed outside the furnace. The receiver includes a source of millimeter/sub-millimeter-wave or microwave probe beam energy, and the radiation includes a surface emission portion and a surface reflection portion which includes the probe beam energy reflected from the surface. Apparatus is provided for determining the temperature of the surface from the surface emission portion and the surface reflection portion.

Because of their long wavelength of operation, millimeter-wave pyrometers can see through atmospheres that are visibly opaque such as fog and smoke. Their wavelength is still short enough for good spatial resolution. The use of a quasi-optical graphite antenna system is suitable for placement inside a hot furnace environment. Graphite components can be used at temperatures as high as 3000° C. The use of the output leakage of the pyrometer's own local oscillator as a probe beam provides for a surface reflection measurement which can be related to the surface emissivity to calibrate the temperature measurement. In the prior art, an assumption had to be made about the surface emissivity of the inside furnace wall in order to interpret an output signal as temperature. Emissivity depends on temperature and on wall deposits which cannot be accurately predicted in advance. By providing a measure of emissivity, the accuracy of the pyrometer of the invention is improved over the infrared pyrometers of the prior art.

In an alternative embodiment of the invention, standing wave interference due to a coherent probe beam is accounted for by slowly mapping out the interference pattern and only taking peak values. In the time domain, this can be accomplished by slowly sweeping the probe frequency (slow relative to the chopper frequency). In the spatial domain, this is accomplished by slowly translating the pyrometer system to change the signal pattern length by more than half a wavelength.

In this embodiment, the pyrometer, chopper and associated optics are mounted on a base plate that can be translated along the beam path direction to shorten or lengthen the beam path length by more than one half wavelength.

A visible laser beam may be employed and superimposed on the pyrometer field-of-view to facilitate alignment of the pyrometer system. The visible laser beam is coupled onto the pyrometer field-of-view by a beam splitter and flat mirror. The beamsplitter is placed at an angle to the pyrometer field-of-view beam, preferably about 45°, such that the laser beam incident on the beamsplitter is partially reflected toward the pyrometer. The remaining portion of the laser beam is transmitted through the beamsplitter and reflected back on itself by a flat mirror. After passing through the beamsplitter again, the reflected laser beam is partially reflected toward the surface being viewed by the pyrometer. If the pyrometer is aligned so that its antenna horn and waveguide are collinear with the part of the laser beam directed toward them, then the part of the laser beam directed toward the viewed surface is collinear with the pyrometer field-of-view.

The beamsplitter should be a material that introduces low loss to the pyrometer signals and is visibly transparent. It is preferably made from a thin membrane such as polyethylene or Mylar. The laser is preferably a small solid state device.

The present invention may also include an off-axis parabolic mirror for coupling the pyrometer field-of view to the furnace waveguide. This provides an optical break between the pyrometer electronics and the transmission line, thereby facilitating the translation of the pyrometer for reflection measurements and making it much easier to rotate the waveguide assembly for profile scans of the internal furnace surfaces.

A mirror is used rather than a lens because the mirror avoids lens surface reflection losses and interferences. An off-axis parabolic mirror is required because it avoids distortion of the pyrometer field-of-view when reflecting at a large angle. The focal length of this mirror is selected to provide the correct focusing of the field-of-view to optimally couple it to the waveguide.

In another embodiment of the invention, a corrugated refractory waveguide assembly, which allows a practical and safe implementation on a high temperature furnace, includes a replaceable waveguide/mirror end part, an insulating refractory sleeve, and inert gas flow into the guide across the inside surface of a window. In this embodiment, a portion of the waveguide may be disposed within the furnace and the remaining portion of the waveguide and window may be disposed outside the furnace.

In many furnace applications, the internal furnace environment must be sealed from the outside atmosphere. The waveguide assembly therefore has a window to prevent air from leaking in or furnace gases from escaping. Preferably, the window is installed at a slight angle to the long axis of the waveguide to prevent direct back reflection of a diagnostic probe beam. The window material is transparent to millimeter/submillimeter-wave or microwave radiation and can be made of polytetrafluoroethylene with scribed surfaces to further prevent surface reflections or the like. Polytetrafluoroethylene, such as that available under the trademark Teflon™ (DuPont), is suitable for use in the invention.

Provision is made for a cool inert gas flow, such as nitrogen, across the inside window surface and down the waveguide into the furnace. The gas flow helps to keep the window cool and clean. In addition, the gas flow purges oxygen and other furnace off gases from the waveguide which could corrode the internal surfaces of the waveguide or leave deposits which could degrade millimeter/submillimeter-wave or microwave performance. The corrugated waveguide has an internal diameter which is greater than one wavelength, and a sufficient length for millimeter/submillimeter-wave or microwave propagation. The replaceable end of the waveguide preferably includes a flat miter mirror surface which directs the millimeter/submillimeter-wave or microwave radiation at a 90° angle to the long axis of the guide. While a miter mirror built into the end of the waveguide is not necessary for accessing a hot furnace, this construction makes it possible to scan the millimeter/submillimeter-wave or microwave field-of-view by a simple rotation of the waveguide assembly about its long axis.

The replaceable end of the waveguide will typically be inside the furnace, and thus exposed to a harsh, high temperature environment. Consequently, this end of the waveguide can corrode, become coated, and/or degrade millimeter/submillimeter-wave or microwave performance in some other way. By making this part of the waveguide assembly easily replaceable, the waveguide assembly can be readily repaired if furnace damage occurs.

The majority of the conducting refractory waveguide is enclosed inside an insulating refractory sleeve such as alumina tubing. This sleeve provides additional strength, holds together multiple guide lengths if more than one is used, and with the insulating window flange electrically insulates the conducting part of the guide assembly.

In another alternative embodiment of the invention, a chopperless active pyrometer system that is capable of automatic calibration is provided. This system utilizes one or more millimeter-wave switches in the pyrometer electronics between the horn antenna and the mixer. For example, one millimeter-wave switch may be used to provide a reference temperature for the difference signal measurement and another millimeter-wave switch may be used for the calibration temperature. Each switch can be set to direct the pyrometer field-of-view toward the launch horn antenna or toward a millimeter-wave absorber held at a known temperature. Preferably, the switches each have a switch controller for controlling the switching, and the millimeter-wave absorbers each have a thermocouple attached to precisely monitor the reference and calibration temperatures. The switch controller for the reference temperature switch supplies a reference signal to the lock-in amplifiers for detection of the intermediate frequency (IF) and direct current (DC) signals.

The switches could be single-pole-double-throw solid state PIN diode switches or mechanical waveguide switches. The reference temperature source could be a room temperature millimeter-wave absorber such as carbon impregnated foam plastic blocking one of the switch ports. The calibration source could be a heated or chilled millimeter-wave absorber such as an absorbing ceramic material blocking one of he switch ports. A single switch could also serve both the reference and calibration temperature functions if the temperature of the millimeter-wave absorber could be changed on time scales short relative to the temperature changes of the surface being monitored.

The present invention further provides for the use of an incoherent probe beam to eliminate the standing wave interference for reflection measurements. Preferably, the source of incoherent radiation is the hot surface being monitored. In this embodiment, an auxiliary reflector is positioned to reflect surface emission to the pyrometer via a reflection off the surface being viewed by the pyrometer. Equivalently, the auxiliary reflector redirects a part of the pyrometer field-of-view. The auxiliary reflector can be moved or blocked to measure the increase in the pyrometer signal relative to the pyrometer viewing the surface without an auxiliary reflector. The surface emissivity is determined by comparing the pyrometer signal with and without the auxiliary reflector.

According to this embodiment of the invention, surface emissivity measurement is not limited to the millimeter/submillimeter-wave or microwave wavelength range. It could be used at any pyrometer wavelength where the surface being viewed has a sufficient mirror surface such that the reflection is specular (non distorting or scattering of the pyrometer field-of-view).

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Description of the Preferred Embodiment.

BRIEF DESCRIPTION OF THE DRAWINGS

For a fuller understanding of the present invention, reference is had to the following description taken in conjunction with the accompanying drawings, in which:

FIG. 2(a) is a plane view of a phase splitter for use in conjunction with the invention;

FIG. 2(b) is a cross-sectional view of the phase splitter of FIG. 2(a);

FIG. 3 is a cross-sectional view of a surface whose temperature is to be measured;

FIG. 10 illustrates temperature and reflection signals using the embodiment of the invention illustrated in FIG. 6 in a Mark II furnace.

Similar reference characters refer to similar parts throughout the several views of the drawings.

DESCRIPTION OF THE PREFERRED EMBODIMENTS

Figures 1, 1A:
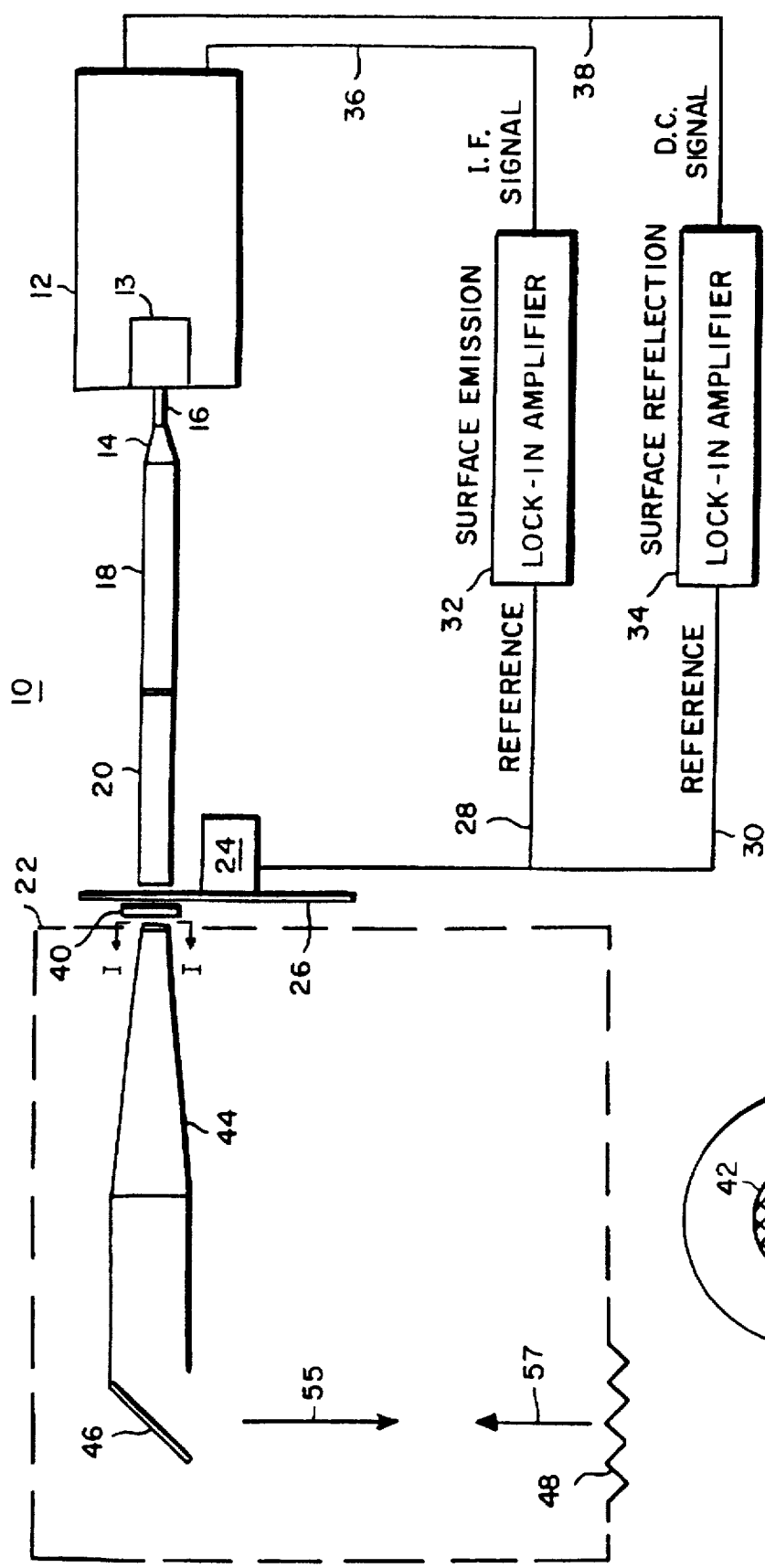
FIG. 1 is a schematic illustration of the active pyrometer of the present invention.
FIG. 1(a) is a sectional view taken along I—I of FIG. 1.

The present invention is based on using a millimeter/submillimeter-wave or microwave pyrometer to detect the electromagnetic radiation from furnace walls. Millimeter-wave pyrometers are commonly used for measuring temperature in the environment. See, Rainwater, Radiometers: Electronic Eyes that See Noise, *Microwaves*, pp. 58–62 (1978). Such radiometers, however, have not been used in the hot, hostile environment present within a furnace. With reference now to FIG. 1, the active pyrometer system 10 of the invention includes a millimeter/sub-millimeter-wave or microwave receiver 12. The receiver 12 receives energy through a waveguide taper and transition 14 which serves as an interface between the fundamental waveguide 16 of the receiver and a more efficient overmoded transmission line 18. This interface may also be optical, via a lens or focusing mirror if the receiver 12 mixer uses a quasi-optical antenna such as a corner cube. See, Fetterman et al, Far-IR Heterodyne Radiometric Measurements with Quasi-optical Schottky Diode Mixers, *Appl. Phys. Lett.*, Vol. 33, pp. 151–154 (1978). If a smooth walled metal waveguide such as a cylindrical copper tube as shown at 18 is used as the transmission line to propagate a transverse electric (TE) field mode, then there is a mode converter 20 to convert the TE transmission line mode to an $HE_{11}$ mode. See, Tumm, Computer-aided Analysis and Design of Corrugated $TE_{11}$ to $HE_{11}$ Mode Converters in Highly Overmoded Waveguides, *Intern. J. of Infrared and Millimeter Waves*, Vol. 6, pp. 577–597 (1985). A mode converter such as the mode converter 20 is not necessary if the receiver field-of-view is already in an optical beam such as from a corner cube antenna.

The $HE_{11}$ mode, a transverse electric and magnetic field mode, is the most efficient waveguide mode that can be propagated by waveguide and efficiently couples to a free space Gaussian beam. A Gaussian beam is the best free space propagating mode for achieving diffraction limited spatial resolution. Propagating an $HE_{11}$ mode in waveguide requires either a dielectric waveguide or a corrugated internal surface for a waveguide made from a conductor material. It is the properties of the $HE_{11}$ mode which forms the basis for the use of a graphite waveguide material inside a furnace 22 and for achieving the best possible spatial resolution. The inventors herein have found that graphite is a good conductor in the millimeter/sub-millimeter wavelength range and can be made into an efficient corrugated waveguide for $HE_{11}$ mode propagation over short distances.

At the input to the mode converter 20 there is a chopper 24 which periodically blocks the receiver 12 field-of-view into the furnace 22 by means of room temperature blades 26. The blades 26 are covered with a millimeter/sub-millimeter-wave or microwave absorbing material such as Eccosorb™ to provide a room temperature black-body reference signal as in a Dicke receiver. See, Krauss, *Radio Astronomy*, Chapter 7 by M. E. Tiuri, "Radio-Telescope Receivers," McGraw Hill, New York (1975). The chopper 24 provides reference signals 28 and 30 corresponding to the chopping frequency to lock in amplifiers 32 and 34. The lock in amplifier 32 is provided for the detection of the intermediate frequency (IF) signal 36 from the receiver 12 corresponding to surface emission and the lock in amplifier 34 is provided for the detection of the chopper modulated DC signal 38 from the receiver 12 corresponding to surface reflection. Alternatively, signal 38 could be an IF signal at a different frequency from IF signal 36 if the probe beam is at a different frequency relative to the local oscillator 13.

A phase splitter 40 is disposed between the chopper 24 and a window 42 in a graphite waveguide 44. The phase splitter 40 will be described in more detail below in conjunction with FIGS. 2(a) and 2(b). The window 42 spans the waveguide 44 to seal the furnace 22. The window 42 is made of a material that is transparent in the millimeter/submillimeter-wave or microwave range such as polytetrafluoroethylene, polyethylene, or quartz. As shown in FIG. 1(a), the window can be made with scribed surfaces to further prevent surface reflections or the like. Polytetrafluoroethylene, such as that available under the trademark Teflon™(DuPont), is suitable for use in the invention. Polytetrafluoroethylene is preferred at the longer wavelength end of the millimeter/sub-millimeter-wave or microwave range because of its low index of refraction which minimizes window surface reflection losses. Window reflection losses can also further be minimized by corrugating the surfaces (See, Wilson et al, The Optical Properties of Moth Eye Antireflection Surfaces, *Optica Acta*, Vol. 29, pp. 993–1009 (1982) or Brewster's angle placement.

The corrugated $HE_{11}$ graphite waveguide 44, because of the higher resistivity of graphite, is of a larger diameter than the copper transmission line 18 to keep transmission losses low. As will be appreciated by those skilled in the art, transmission line losses are inversely proportional to the third power of the waveguide radius. Another advantage of a larger diameter waveguide at the furnace end is that the divergence of the receiver 12 field-of-view is minimized for good spatial resolution. A waveguide taper is used to increase the guide diameter. In FIG. 1, this taper is shown in the graphite waveguide 44 on the furnace side of the window 42 but it could also be made of copper on the outside of the furnace window.

Inside the furnace 22, a graphite mirror 46 is used to direct receiver 12 field-of-view toward the hot furnace surface 48 to be monitored for temperature. The graphite waveguide 44 and the mirror 46 may be rotated to scan a temperature profile. A further function of the mirror 46 is to block the window 42 from having a direct view of the hot surface 48 which keeps the window 42 cleaner and cooler. Deposits, however, on the window 42 or mirror 46 are not critical because of the millimeter/sub-millimeter wavelength of operation.

As will be discussed below in conjunction with FIG. 4, the receiver 12 includes a local oscillator or other source for a probe beam. The purpose of the phase splitter 40 is to compensate for the coherent nature of the probe beam. Instrumental standing wave interference effects are averaged out with the phase splitter 40. With reference now to FIGS. 2(a) and 2(b), the phase splitter 40, preferably made of a material such as Teflon™, includes a step S having a dimension given by:

$$S = \frac{m}{4n\lambda}$$

where m is an odd integer (m=1, 3, 5 ...) preferably 1, n is the index of refraction of the phase splitter material, and λ is the wavelength in free space. The phase splitter 40 is positioned so that the step precisely cuts through the middle of the pyrometer beam so that half the beam goes through the thicker part and the other half goes through the thinner part. Thus on reflection, the two halves of the beam are 180° out of phase with each other. If the top half of the beam is on an interference peak, the bottom half will be on an interference minimum, and conversely. Therefore the coherent interference in the local oscillator beam is always automatically averaged out. More than one step can be used to reduce the requirement for precise positioning of the phase splitter.

As shown in FIG. 3, the hot surface 48 whose temperature is to be measured, is preferably made up of 90° corners in a refractory material such as bricks 49 used for lining the wall of the furnace 22. An orientation angle represented by θ can be skewed so that the corners are machined in a direction from which the pyrometer beam 50 is coming.

The 90° corners shown in FIG. 3 do not have to be three-dimensional if the pyrometer beam 50 is in the same plane as the corners. The reflectivity of a flat sample of brick material 49 is first calibrated at room temperature; then this value is used to calibrate the room temperature reflectivity of the corner reflector. The corner reflection signal is generally equal to the flat surface reflectivity squared. Alternative retroreflector designs can include focusing mirror surfaces machined into refractory material. The step of phasesplitter 40 would be oriented orthogonal to the valley of corners 48.

Figure 4:
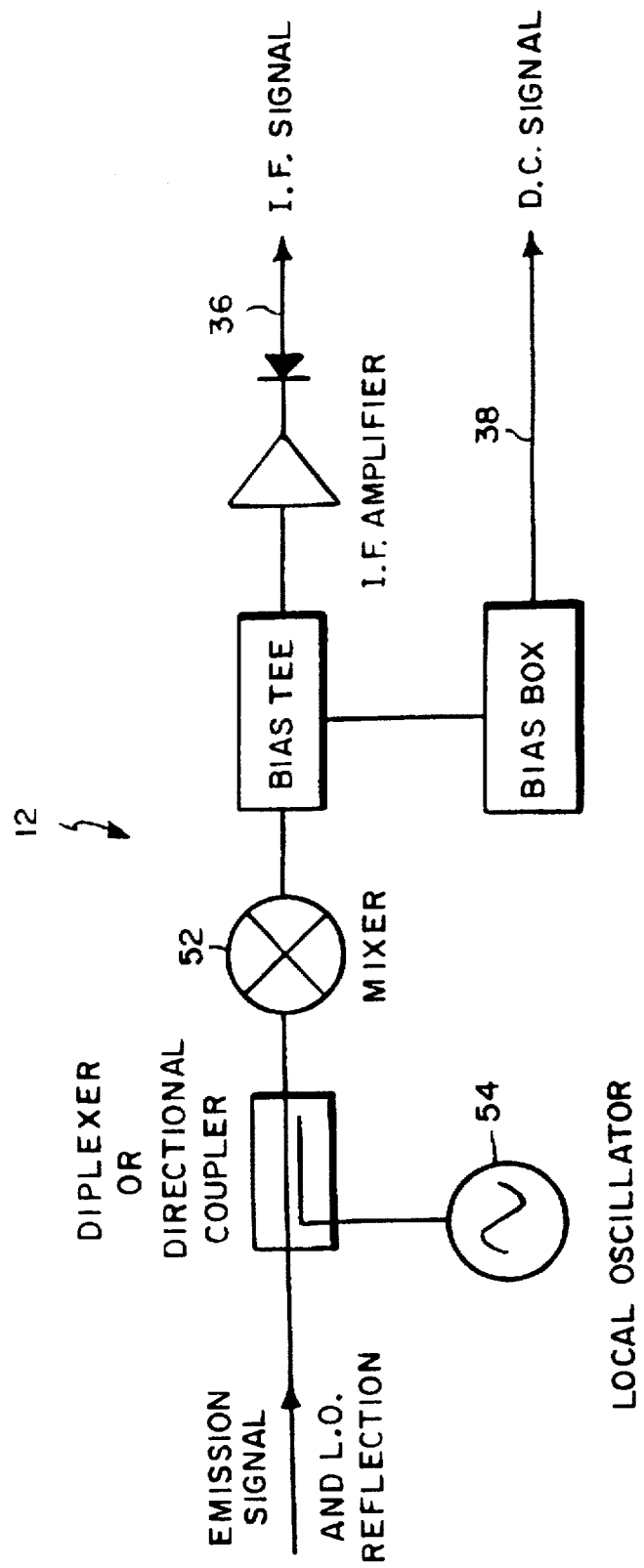
FIG. 4 is a block diagram of the millimeter/submillimeter-wave or microwave receiver used in the invention.

With reference now to FIGS. 1 and 4, the receiver 12 has two outputs, namely the IF signal 36 and the DC signal 38. The two outputs 36 and 38 correspond to the intermediate frequency signal and to the direct current level on a mixer 52. The IF signal 36 has a wide bandwidth (approximately 1–10 GHz) double sideband and is the down shifted emission frequency from the hot surface 48 being monitored. This signal 36 is linearly proportional to the temperature of the surface 48. Wide bandwidth operation is important for good signal-to-noise ratio since the signal-to-noise ratio is proportional to the square root of the bandwidth.

The DC signal 38 has a component that is proportional to the reflection from the hot surface 48 of a local oscillator (LO) 54 beam 55 (FIG. 1). The DC signal 38 is modulated by the chopper 24 and therefore is readily distinguishable from the LO and DC bias levels on the mixer 52. Importantly, the present invention takes advantage of the back reflection of a part of the local oscillator 54 signal 55 incident on the mixer 52 back along the receiver field-of-view after reflection from the hot surface 48. Alternatively, a source different from the local oscillator could be used for the probe beam. In this case signal 38 would be an IF signal with the surface reflection signal and signal 36 would be the IF signal without the surface reflection signal. The reflectivity of the hot surface is related to its emissivity through Kirchhoff's law. See, Incropera et al, *Introduction to Heat Transfer*, 2d Ed., Chapter 12, Section 12.6, John Wiley and Sons, New York (1990). The emissivity of a surface must be known in order to interpret the surface emission, as measured by the surface emission IF signal, as a temperature. The present invention provides for simultaneous surface emissivity calibration.

Instead of using the phase splitter 40 to compensate for the coherent nature of the local oscillator 54 signal, an alternative scheme frequency modulates the local oscillator. The frequency sweep of the modulation should be as great as or greater than $$\frac{c}{2L}$$

where c is the speed of light and L is the path length from the receiver 12 to the hot surface 48 which is being observed. Such a frequency sweep should be made rapidly compared to signal integration time. The received signal will then be an average of the instrumental interference peaks and minima. This alternative scheme for compensation for local oscillator 54 coherence is averaging in the time domain whereas the phase splitter 40 effects averaging in the spatial domain. A combination of both of these coherence compensation schemes may be used.

In operation, energy 57 from the hot surface 48 is directed into the graphite waveguide 44. This energy 57 is a combination of energy emitted from the hot surface 48 and portion 55 of the local oscillator 54 energy reflected from the hot surface 48. This combined emission and reflection energy 57 passes through the window 42 and phase splitter 40 and is chopped by the chopper 24. The energy proceeds through the mode converter 20 into the waveguide 18 and subsequently through the fundamental waveguide 16 to the receiver 12. The receiver 12 has an IF output 36 and a DC output 38. As stated above, the IF signal 36 is linearly proportional to the temperature of the surface and the DC signal 38 is proportional to the reflectivity of the hot surface 48. The reflectivity is related to its emissivity through Kirchhoff's law. Thus, by monitoring a signal related to emissivity, the active pyrometer of the invention is being continuously calibrated for any changes in emissivity which result from surface deposits or other factors.

As discussed above, coherent interaction between the transmitted and reflected beam requires that interference peaks be averaged out either in the spatial domain by using a phase splitter plate or in the time domain by rapidly sweeping the probe frequency in order to use active probing of the surface reflectivity with a coherent probe beam. In an alternative embodiment of the invention, a system is provided to slowly map out the interference pattern and only take peak values. In the time domain, this can be accomplished by slowly sweeping the probe frequency (slow relative to the chopper frequency). In the spatial domain, this is accomplished by slowly translating the pyrometer system to change the signal pattern length by more than half a wavelength.

Figure 5:
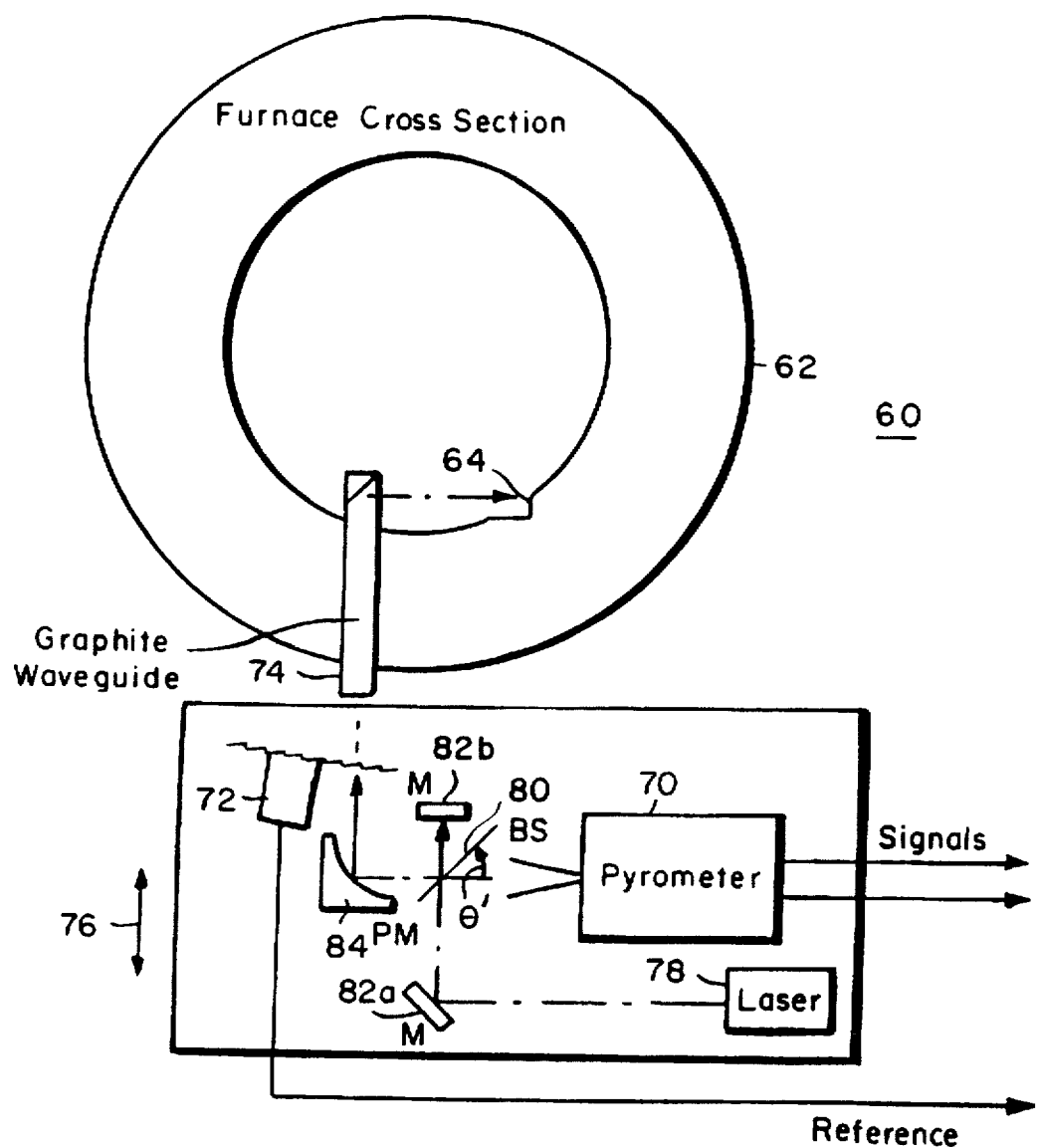
FIG. 5 illustrates a system configuration for use in mapping out the interference pattern by slowly translating the pyrometer system in accordance with an alternative embodiment of the present invention.

FIG. 5 shows a plan view of a system configuration 60 that is suitable for use in mapping out the interference pattern by slowly translating the pyrometer system in accordance with this embodiment of the invention. The pyrometer 70, chopper 72 and associated optics are mounted on a base plate 76 that can be translated along the beam path direction to shorten or lengthen the beam path length by more than one half wavelength.

The system preferably includes a visible laser beam 78 superimposed on the pyrometer field-of-view to facilitate alignment of the pyrometer system. As further shown in FIG. 5, the visible laser beam 78 is coupled onto the pyrometer field-of-view by a beam splitter 80 and flat mirror 82a. The beamsplitter 80 is placed at an angle θ to the pyrometer field-of-view beam. Preferably, angle θ' is about 45° such that the laser beam incident on the beamsplitter 80 is partially reflected toward the pyrometer 70. The rest of the laser beam is transmitted through the beamsplitter 80 and reflected back on itself by a flat mirror 82b. After passing through the beamsplitter 80 again, the reflected laser beam is partially reflected toward the surface being viewed 64 by the pyrometer 70. If the pyrometer 70 is aligned so that its antenna horn and waveguide 74 are collinear with the part of the laser beam directed toward them, then the part of the laser beam directed toward the viewed surface is collinear with the pyrometer field-of-view.

The beamsplitter 80 should be formed of a material that introduces low loss to the pyrometer signals and is visibly transparent. The beamsplitter 80 is preferably made from a thin membrane, such as polyethylene, polyester, e.g. Mylar™(DuPont), or the like. The laser 78 is preferably a small solid state device.

System 60 also preferably includes an off-axis parabolic mirror 84 for coupling the pyrometer field-of view to the furnace waveguide 74. This provides an optical break between the pyrometer electronics and the transmission line, thereby facilitating the translation of the pyrometer for reflection measurements and making it much easier to rotate the waveguide assembly for profile scans of the internal furnace surfaces.

A mirror is used rather than a lens because it avoids lens surface reflection losses and interferences. An off-axis parabolic mirror is required because it avoids distortion of the pyrometer field-of-view when reflecting at a large angle. The focal length of this mirror is selected to provide the correct focusing of the field-of-view to optimally couple it to the waveguide.

Figure 6:
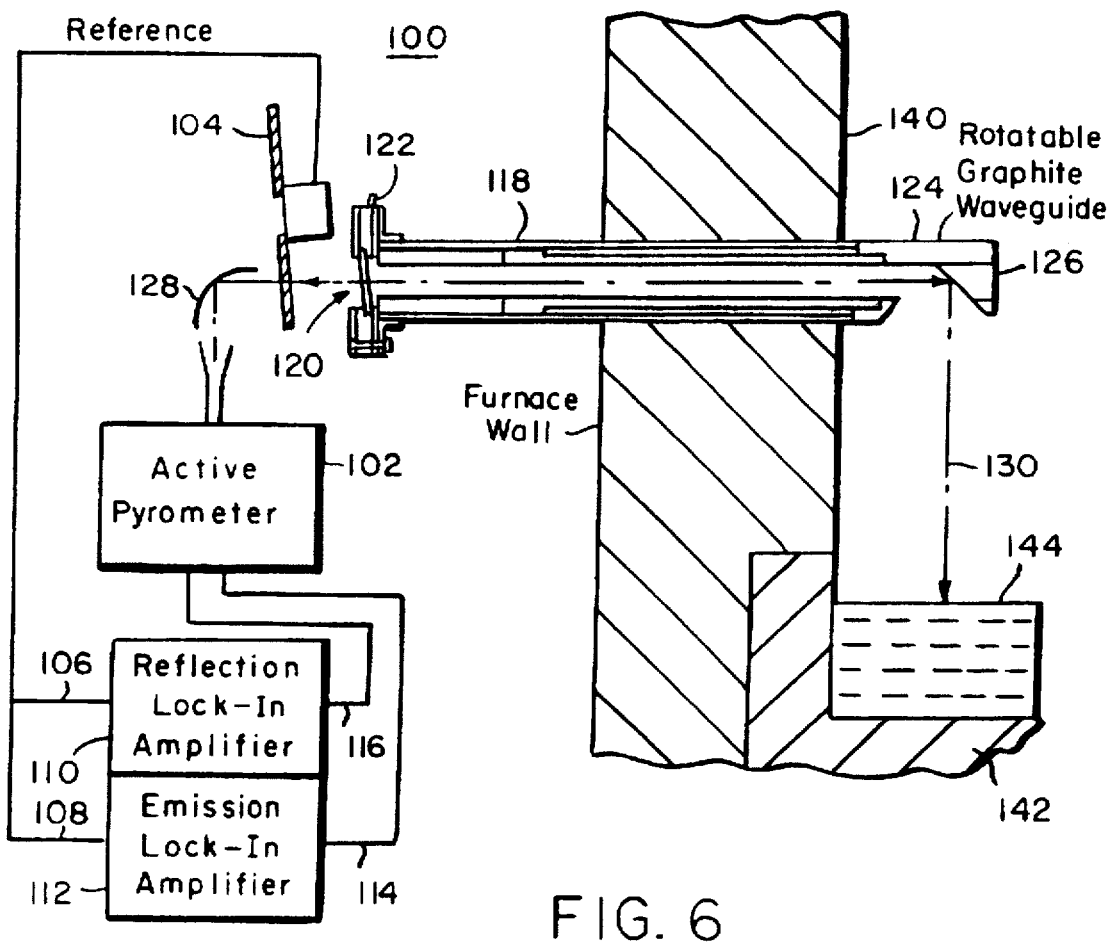
FIG. 6 is an active millimeter-wave pyrometer configuration for use in conjunction with the invention.
Figure 7:
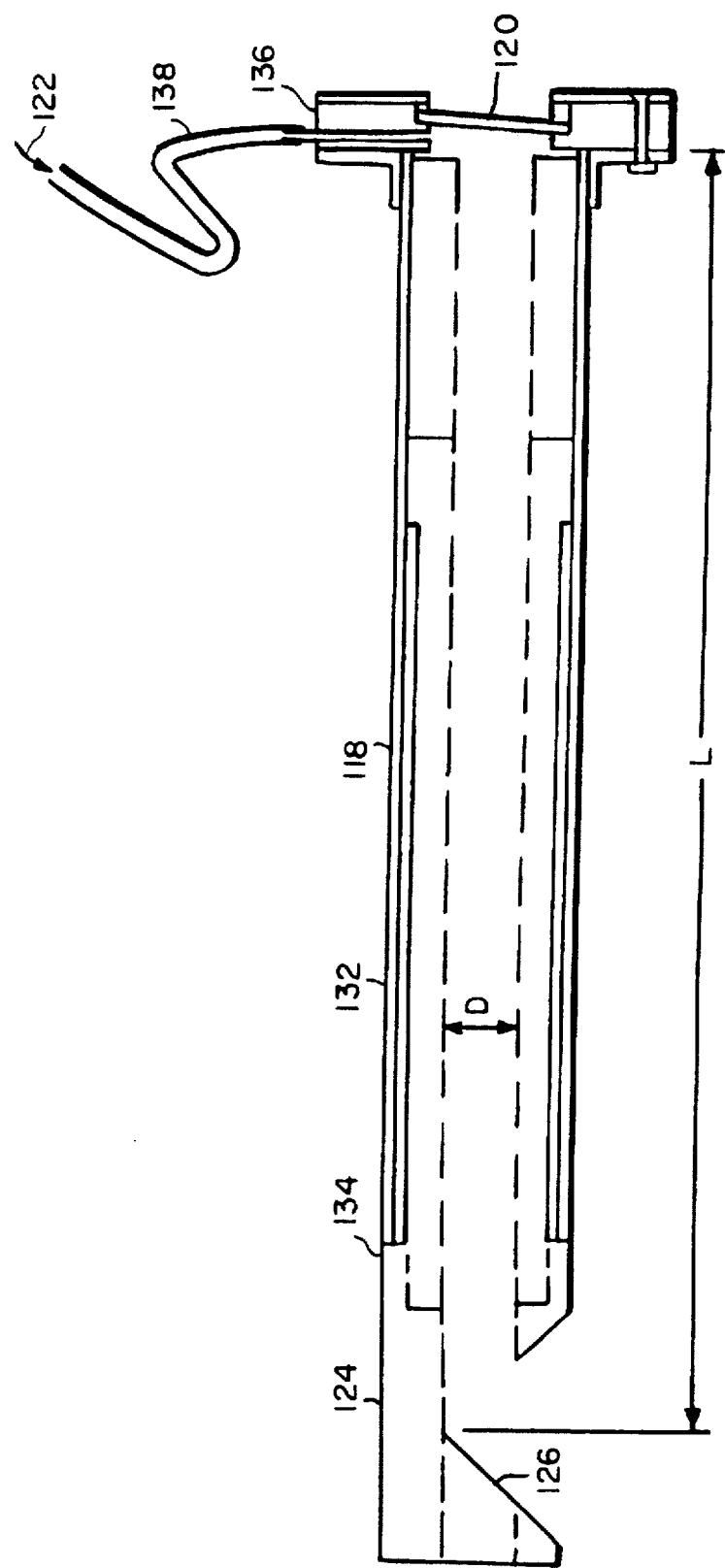
FIG. 7 is an enlarged view of the waveguide assembly shown in FIG. 6.

As discussed above in connection with FIGS. 1–4, an internally corrugated waveguide for propagating the $HE_{11}$ mode allows the use of nonideal conductor refractory materials for the construction of efficient millimeter/submillimeter-wave or microwave waveguides that can be implemented on and in a furnace. Referring now to FIGS. 6 and 7, an active millimeter-wave pyrometer and corrugated refractory waveguide assembly, which allow practical and safe implementation on a high temperature furnace, include a replaceable waveguide/mirror end part, an insulating refractory sleeve, and inert gas flow into the guide across the inside surface of the window. In this embodiment, a portion of the waveguide may be disposed within the furnace and a portion of the waveguide and the window may be disposed outside the furnace (as shown in FIG. 6).

As also illustrated in FIG. 6, pyrometer system 100 includes an active millimeter-wave pyrometer 102, chopper 104, waveguide 118 and window 120. Chopper 104 provides reference signals 106 and 108 corresponding to the chopping frequency to lock in amplifiers 110 and 112. The lock in amplifier 112 is provided for the detection of the intermediate frequency (IF) signal 114 from the receiver 102 corresponding to surface emission and the lock in amplifier 110 is provided for the detection of the chopper modulated DC signal 116 from the receiver 102 corresponding to surface reflection. Alternatively, signal 116 could be an IF signal at a different frequency from IF signal 114 if the probe beam is at a different frequency relative to the local oscillator.

The corrugated waveguide 118 has an internal diameter D, which is greater than one wavelength, and a length L which is sufficient for millimeter/submillimeter-wave or microwave propagation. The replaceable end portion 124 of the waveguide in this illustration preferably has a flat miter mirror 126 surface which directs the millimeter/submillimeter-wave or microwave radiation at a 90° angle to the long axis of the guide. Other angles of direction are also possible and the miter mirror surface could be a curved focusing surface. While a miter mirror built into the end of the waveguide is not necessary for accessing a hot furnace, it allows scanning of the millimeter/submillimeter-wave or microwave field-of-view by a simple rotation of the waveguide assembly about its long axis.

The end portion 124 of the waveguide, which will typically be inside the furnace, is exposed to a harsh, high temperature environment. Consequently, it can corrode, become coated, and/or degrade millimeter/submillimeter-wave or microwave performance in some other way. By making this part of the waveguide assembly easily replaceable, the waveguide assembly can be readily repaired if furnace damage occurs. The attachment of the replaceable end portion 124 can be by a screw thread on the outside of the straight guide length and a corresponding thread on the inside of a recess inside the end part.

The majority of the conducting 134 refractory waveguide is enclosed inside an insulating refractory sleeve 132 such as alumina tubing. Sleeve 132 provides additional strength, holds together multiple guide lengths if more than one is used, and with the insulating window flange 136 electrically insulates the conducting part of the guide assembly. Electrical insulation is very important for safety in electric furnace applications.

In many furnace applications, the internal furnace environment must be sealed from the outside atmosphere. The waveguide assembly therefore has a window 120 to prevent air from leaking in or furnace gases from escaping. The window is installed at a slight angle to the long axis of the waveguide 118 to prevent direct back reflection of a diagnostic probe beam. The window material is transparent to millimeter/submillimeter-wave or microwave radiation, and as stated above, can be made of Teflon™ with scribe surfaces to further prevent surface reflections.

Provision is made for cool inert gas flow 122 across the inside window surface and down the waveguide into the furnace. The gas flow helps to keep the window cool and clean. In addition, inert gas flow 122 purges oxygen and other furnace off gases from the waveguide which could corrode the internal surfaces of the waveguide or leave deposits which could degrade millimeter/submillimeter-wave or microwave performance. While not intended to be construed as limiting, the inert gas is preferably nitrogen gas because it is readily available and inexpensive. The inert gas flow is connected to the waveguide assembly by a flexible hose 138 so that this assembly is free to rotate and otherwise move.

As further shown in FIG. 6, furnace 140 includes hearth 142 for slag 144. An off-axis parabolic mirror 128 may be employed in order that an off-axis parabolic mirror 84 for coupling the pyrometer field-of view to the furnace waveguide. This provides an optical break between the pyrometer electronics and the transmission line, thereby facilitating the translation of the pyrometer for reflection measurements and making it much easier to rotate the waveguide assembly for profile scans of the internal furnace surfaces. As described above, a mirror is used rather than a lens because it avoids lens surface reflection losses and interferences. An off-axis parabolic mirror is required because it avoids distortion of the pyrometer field-of-view when reflecting at a large angle. The focal length of this mirror is selected to provide the correct focusing of the field-of-view to optimally couple it to the waveguide.

The embodiments described above have included a chopper located in the field-of-view of the pyrometer between the pyrometer and furnace. The blades of the chopper are covered with a millimeter/submillimeter-wave or microwave absorbing material so that when a blade blocks the receiver field-of-view, the receiver is viewing a room temperature reference black-body. The pyrometer temperature measurement is a difference signal between this room temperature reference and the surface being viewed. Calibration of the pyrometer difference signal is achieved by occasionally inserting a black-body surface with a known temperature into the receiver field-of-view beam just beyond the chopper.

Figure 8:
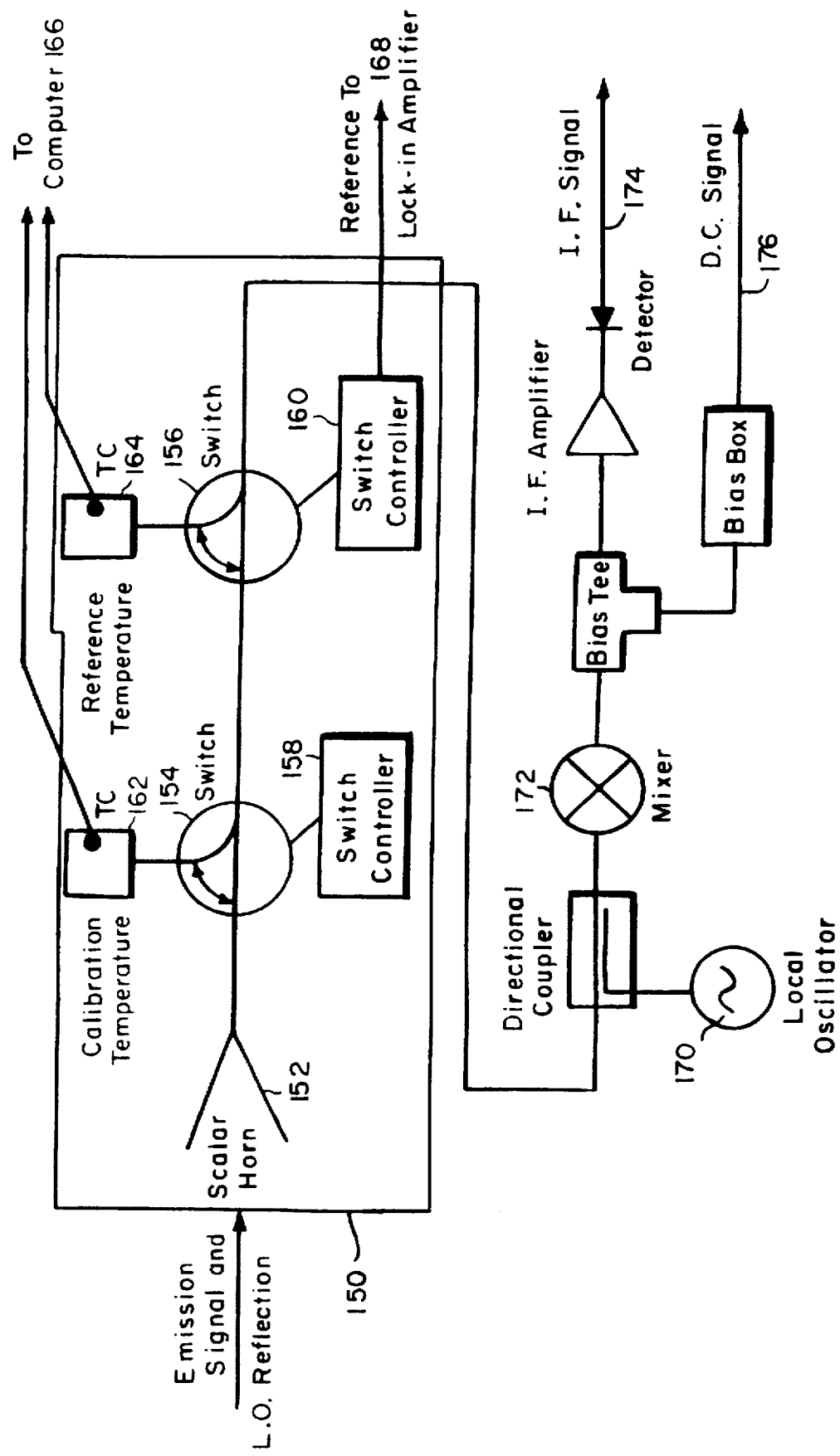
FIG. 8 is a block diagram of a millimeter-wave pyrometer for chopperless operation and automatic calibration in accordance with an alternative embodiment of the invention.

In another embodiment of the invention, a more compact chopperless active pyrometer system having the capability for automatic calibration is provided. This is accomplished by the use of one or more millimeter-wave switches in the pyrometer electronics between the horn antenna 152 and the mixer 172. FIG. 8 shows a millimeter-wave pyrometer circuit 150 with the components for chopperless operation and automatic calibration enclosed in the dashed rectangle. Preferably, two millimeter-wave switches are used, one switch 154 to provide a reference temperature for the difference signal measurement and another switch 156 for the calibration temperature.

Each switch can be set to direct the pyrometer field-of-view toward the launch horn antenna 152 or toward a millimeter-wave absorber held at a known temperature. The switches 154, 156 each have a switch controller 158, 160, respectively, for controlling the switching. In addition, the millimeter-wave absorbers each have a thermocouples 162, 164, respectively, attached to precisely monitor the reference and calibration temperatures. Thermocouples 162, 164 are connected to computer 166 as shown in FIG. 8. The switch controller for the reference temperature switch supplies a reference signal 168 to the lock-in amplifiers for detection of the intermediate frequency (IF) signal 174 and DC signal 176.

The switches could be single-pole-double-throw solid state PIN diode switches or mechanical waveguide switches. The reference temperature source could be a room temperature millimeter-wave absorber such as carbon impregnated foam plastic blocking one of the switch ports. The calibration source could be a heated or chilled millimeter-wave absorber such as an absorbing ceramic material blocking one of he switch ports.

Single-pole-single-throw switches could also be used if the switch when closed absorbed millimeter-wave radiation. In this case, the temperatures of the switches themselves would serve the reference and calibration temperature functions. A single switch could also serve both the reference and calibration temperature functions if the temperature of the millimeter-wave absorber could be changed on time scales short relative to the temperature changes of the surface being monitored.

Previous embodiments of the active millimeter-wave pyrometer made use of a coherent probe beam for back reflection measurements of the viewed surface for surface emissivity determinations. In another alternative embodiment of the invention, an incoherent probe beam is employed. It is preferred that the source of incoherent radiation is the hot surface being monitored.

Figures 9A, 9B:
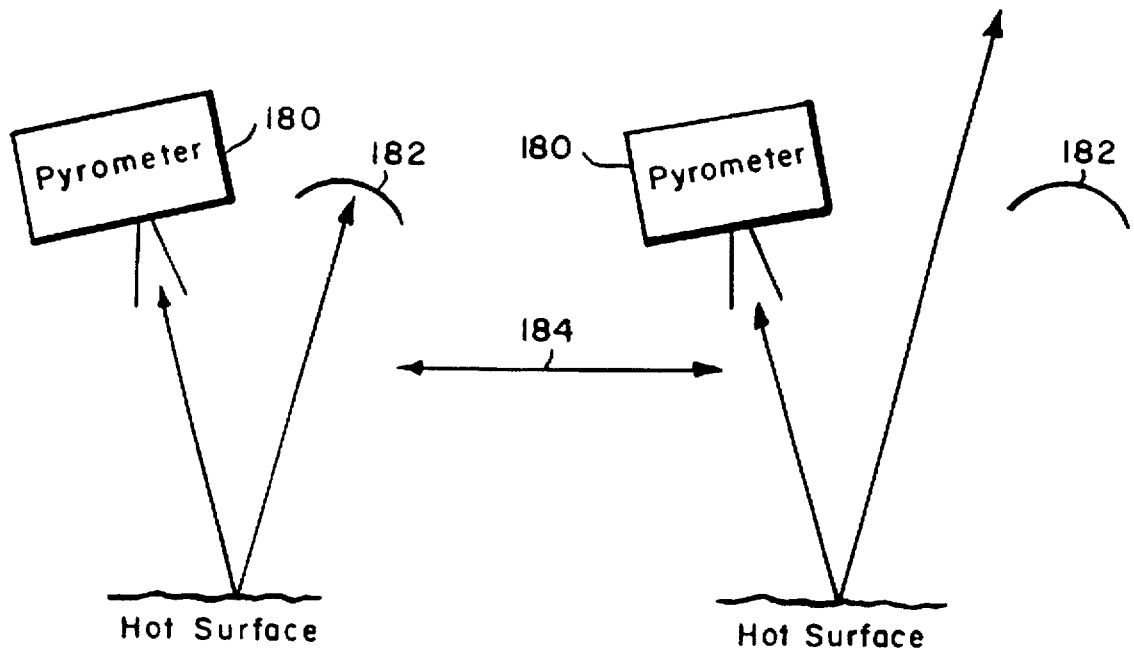
FIGS. 9(a) and 9(b) show a pyrometer being used in conjunction with an auxiliary reflector in accordance with the present invention.

FIGS. 9(a) and 9(b) show the implementation of a pyrometer 180 for surface emission for reflectivity measurements. An auxiliary reflector 182 is positioned to reflect surface emission to the pyrometer 180 via a reflection off the surface being viewed by the pyrometer 180. Equivalently, the auxiliary reflector 182 redirects a part of the pyrometer field-of-view. The auxiliary reflector 182 can be moved or blocked as shown by arrow 184 to measure the increase in the pyrometer signal (as shown in FIG. 9(a)) relative to the pyrometer viewing the surface with no auxiliary reflector (as shown in FIG. 9(b)).

A perfect black-body surface (emissivity equal to 1) would have zero reflection and the auxiliary reflector would not increase the pyrometer signal. As the surface emissivity decreases (less surface absorption), the auxiliary reflector would contribute an increasing component to the pyrometer signal in direct proportion to the surface emissivity. The surface emissivity is thus determined by comparing the pyrometer signal with and without the auxiliary reflector.

In this embodiment of the invention, the technique for surface emissivity measurement is not limited to the millimeter/submillimeter-wave or microwave wavelength range. It could be used at any pyrometer wavelength where the surface being viewed has a good mirror surface so that the reflection is specular (non distorting or scattering of the pyrometer field-of-view). However, this condition on the viewed surface is more readily achieved at longer wavelengths such as the millimeter-wave range.

EXAMPLE 1

In this Example, continuous real time monitoring of temperature and hazardous metals emissions in a 1 MW DC graphite electrode arc furnace (Mark II furnace) were tested in accordance with the embodiment shown in FIG. 6. An active millimeter-wave pyrometer with rotatable graphite waveguide/mirror optics inside the furnace proved to be a robust, spatially resolved temperature monitor of the molten slag and refractory surfaces even during waste feeding operations when dense smoke is present.

The active millimeter-wave pyrometer used was a heterodyne receiver with a local oscillator (LO) frequency of 135.4 GHz. Thermal emission was collected in the two sidebands at 133.9–135.0 GHz and 135.8–136.9 GHz and down shifted to 0.4–1.5 GHz for detection. The leaked local oscillator (LO) beam was used as the active probe and its detected reflection produced a DC signal. In this wavelength range, the radiated thermal power from a surface is linearly related to the surface temperature by the relation:

$$P_s = k_B \Delta f \epsilon_s T_s$$

where $k_B$ is Boltzman's constant, $\Delta f$ is the frequency bandwidth over which the signal is detected, $\epsilon_s$, is the surface emissivity, and $T_s$ is the surface temperature. This is in contrast to conventional infrared pyrometers which operate near the peak of the black-body curve and therefore the relationship between emission and temperature can be a high power of temperature, limiting instrument dynamic range.

The present invention has the capability to make linear temperature measurements over the range from room temperature up to about 15,000° C. (limited by the electronics linearity) with a relative temperature resolution of 0.3° C. for signal integration times of one second. Absolute calibration was achieved by using a liquid nitrogen cooled black-body at 77° K. (response of this system to relative temperatures hotter or cooler than room temperature is equivalent). It was estimated that the absolute calibration has an accuracy of better than 5% throughout the furnace runs.

The temperature measurements are all relative to the room temperature black-body surfaces on the blades of a chopper which periodically blocks the pyrometer view into the furnace. A lock-in amplifier referenced to the chopper frequency produces the temperature difference signal. The chopper also modulates the reflection signal and another lock-in amplifier detects this modulated DC signal which is proportional to surface reflectivity and round trip losses in the waveguide and mirror. Thus, the one pyrometer instrument simultaneously provides a surface reflection and a surface emission measurement to determine $\epsilon_s$ and $T_s$, respectively.

A 3.8 i.d. by 1.23 m long graphite waveguide transmits the pyrometer field-of view and probe beam into the furnace through the thick refractory wall. This waveguide is sealed with a Teflon window and purged with nitrogen gas flow to prevent burning of the waveguide. A miter graphite mirror on the end of the guide directs the pyrometer view sideways. Rotation of the waveguide allows complete vertical temperature profiles to be taken with approximately a 5 cm spatial resolution.

The active millimeter-wave pyrometer was used in six Mark II furnace runs. Table 1 summarizes the length of these runs and the maximum temperatures achieved. The pyrometer was operated 24 hours a day throughout these runs plus an additional two to four day cool down period after furnace shut down. The first four runs were refractory conditioning and furnace shake down runs. In Run #5 and Run #6, clean Idaho Falls soil containing a mix of 10% by weight of calcium carbonate was loaded, melted and poured. The active millimeter-wave pyrometer performed reliably throughout all of the runs. It was used as the primary furnace control diagnostic.

TABLE 1

Summary of High-Power Mark II Runs

| Run Number | Run Length (Days) | Maximum Temperature (°C.) |
|---|---|---|
| #1 | 11 | 960 |
| #2 | 10 | 2200 |
| #3 | 5 | 1450 |
| #4 | 1 | 725 |
| #5 | 3 | 1640 |
| #6 | 4 | 1710 |

Typical signals from the active millimeter-wave pyrometer are shown in FIG. 10. The temperature and reflection signal records are for the fourth day of Run #6 from 1:00 a.m. to 1:00 a.m. the next day. Each signal was recorded once every six seconds. Ten 40 pound bags of soil were fed into the furnace with the calcium carbonate in the middle of this day as shown. The view of the pyrometer was down into the hearth rotated slightly toward the section under the loading port. The decrease in slag surface temperature as each soil bag was dropped in is clearly recorded. However, the reflection signal does not show corresponding signal decreases, confirming that the millimeter-wave signals are not significantly affected by the dense smoke present during soil loading.

The pyrometer provided rapid indications of surface temperatures inside the furnace. On a number of occasions, during arcing, rapid temperature rises of hundreds of degrees centigrade on time scales of a few seconds were observed as illustrated by the temperature spike in FIG. 10 when the furnace was briefly restarted. Slight changes in arc power and length were observed to control large, rapid swings in surface temperature. The exponential temperature decrease after a rapid upward temperature spike indicates that these are true surface temperatures in a very thin surface layer and not just reflection of millimeter-wave arc emission. Thermocouples would not have the time response to follow such transients, but would be destroyed by the elevated temperatures.

The simultaneous reflection signal provides a wealth of additional information. The detection of the return signal confirms that the pyrometer has a clear view of the internal furnace surfaces. When viewing a flat surface at normal incidence, the surface emissivity can be determined by reflection signal strength. In this way, it was observed that the millimeter-wave emissivity of the high alumina content refractory wall surface inside Mark II had decreased from about 0.88 when the surfaces were new to the range of 0.71–0.76 since they had acquired a glass coating. Also, turbulence in the slag melt surface is clearly observed as shown in FIG. 10. This turbulence is correlated with temperature, being more rapid at higher temperatures. Note that hours after the arc has been turned off the turbulence continues until the temperature drops below approximately 1000° C. This may also prove useful for monitoring the chemistry in the melt.

Figure 11:
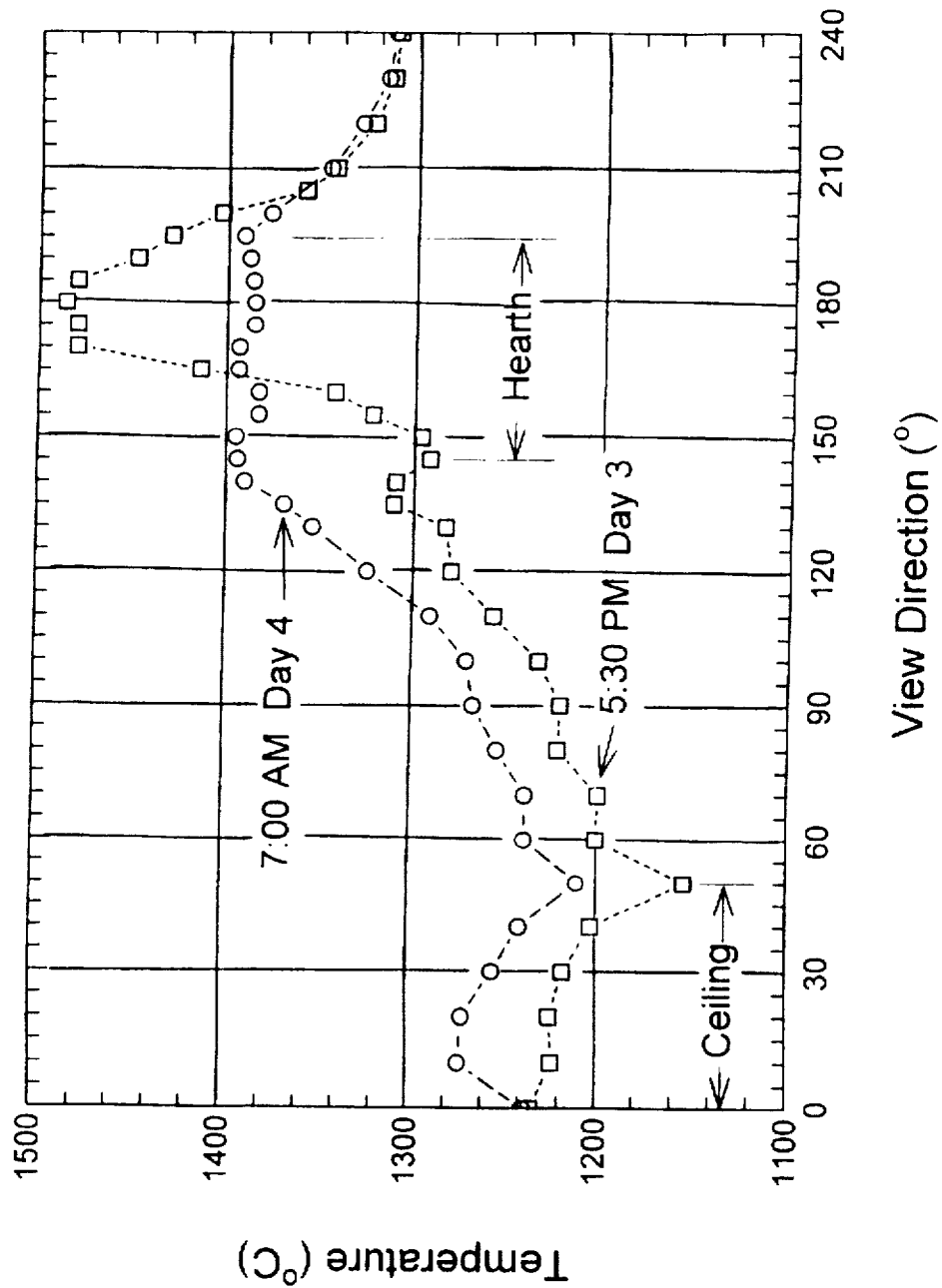
FIG. 11 illustrates temperature profiles using the embodiment of the invention illustrated in FIG. 6 in a Mark II furnace.

The ability to make continuous surface profile temperature measurements inside a furnace with one small penetration is another important capability of the millimeter-wave pyrometer while at the same time providing complete electrical insulation for both personnel safety and minimization of electrical noise in the temperature measuring system. Profiles taken in Run #5 during arcing and when the furnace was up at melt temperatures are shown in FIG. 11. The horizontal axis gives the view direction of the pyrometer where 0° corresponds to looking straight up and 180° corresponds to looking straight down. The trace for day 3 was made after the hearth was filled for the first time. A higher arc voltage made the hearth significantly hotter than the rest of the furnace. The off center appearance of the hot spot in the hearth is most likely due to a slight upward drift in arc voltage during the scan across the hearth which took about 15 to 20 minutes to complete. Overnight, the arc voltage was reduced and by the next morning, the profile scan shows a relatively uniform temperature across the entire melt surface. The furnace in general has also come up to a higher temperature. The capability of the pyrometer to determine the melt surface temperature uniformity was useful to confirm the readiness of the furnace for soil loading.

The present invention provides safe, reliable, robust temperature measurement instrumentation for the monitoring, control and development of furnaces. It should be appreciated by those skilled in the art that the specific embodiments disclosed above may readily be utilized as a basis for modifying or designing other methods or structures for carrying out the same purpose of the present invention. It should also be realized by those skilled in the art that such equivalent constructions do not depart from the spirit and scope of the invention as set forth in the appended claims.

What is claimed is:

1. Pyrometer for temperature measurement comprising:
   a heterodyne millimeter/sub-millimeter-wave or microwave receiver, the receiver adapted to receive radiation from a surface whose temperature is to be measured, wherein a path of the radiation received by the receiver is a field-of-view of the pyrometer;
   a millimeter/sub-millimeter-wave or microwave probe beam source, which emits a probe beam which is reflected from the surface into the receiver; and
   apparatus for mapping out interference patterns associated with the probe beam source and obtaining peak values therefor for emissivity calculation,
   wherein the radiation from the surface includes a surface emission portion and a surface reflection portion including the reflected probe beam, the surface emission portion being related to the surface temperature and the surface reflection portion being related to the emissivity of the surface.

2. The pyrometer of claim 1 wherein the apparatus includes a translatable base plate.

3. The pyrometer of claim 1 further including a laser source which generates a visible laser beam, at least a portion of the visible laser beam capable of being superimposed on the pyrometer field-of-view.

4. The pyrometer of claim 3 wherein the visible laser beam source is coupled to the pyrometer field-of-view by a beamsplitter and a flat mirror.

5. The pyrometer of claim 4 wherein the beamsplitter is positioned at angle of about 45° relative to the central axis of the pyrometer field-of-view.

6. The pyrometer of claim 1 wherein the probe beam source is a local oscillator located in the receiver.

7. The pyrometer of claim 1 further including a waveguide/mirror system for transmitting the probe beam and delivering the radiation to the receiver.

8. The pyrometer of claim 7 further including an off-axis parabolic mirror capable of coupling the pyrometer field-of-view to the waveguide/mirror system.

9. The pyrometer of claim 7 wherein the waveguide/mirror system is capable of being coupled to a furnace.

10. The pyrometer of claim 7 wherein the waveguide/mirror system comprises a waveguide including a replaceable end portion.

11. The pyrometer of claim 10 wherein a mirror is attached to the replaceable end portion of the waveguide.

12. The pyrometer of claim 7 wherein the apparatus includes a translatable base plate for spatially scanning the probe beam source.

13. The pyrometer of claim 7 wherein the waveguide/mirror system comprises a waveguide including a layer of insulator refractory material.

14. The pyrometer of claim 13 wherein the insulating refractory material is alumina.

15. The pyrometer of claim 7 whereby the waveguide/mirror system comprises a waveguide, further including a window positioned proximate to one end of the waveguide.

16. The pyrometer of claim 15 wherein the window is positioned at an angle relative to the waveguide such that direct backward reflection of the probe beam is thereby avoided.

17. The pyrometer of claim 16 wherein the window is formed of a material transparent to millimeter/submillimeter-wave or microwave radiation.

18. The pyrometer of claim 17 wherein the window is formed of polytetrafluoroethylene.

19. The pyrometer of claim 18 wherein the window has scribed surfaces to prevent surface reflections.

20. The pyrometer of claim 15 further including a source of inert gas, the gas being capable of flowing along one side of the window and through the waveguide.

21. The pyrometer of claim 20 wherein the inert gas is nitrogen.

22. The pyrometer of claim 20 wherein the window is formed of polytetrafluoroethylene.

23. The pyrometer of claim 22 wherein the inert gas is nitrogen.

* * * * *

UNITED STATES PATENT AND TRADEMARK OFFICE
CERTIFICATE OF CORRECTION

PATENT NO. : 5,785,426
DATED : July 28, 1998
INVENTOR(S) : Woskov, et al.

It is certified that error appears in the above-identified patent and that said Letters Patent is hereby corrected as shown below:

Column 16, line 2, before "angle" insert --an--.

Signed and Sealed this

Sixteenth Day of February, 1999

Attest:

Attesting Officer

*Acting Commissioner of Patents and Trademarks*